(12) United States Patent
De Witte et al.

(10) Patent No.: US 7,800,503 B2
(45) Date of Patent: Sep. 21, 2010

(54) RADIO FREQUENCY IDENTIFICATION (RFID) TAG ANTENNA DESIGN

(75) Inventors: Erik De Witte, London (GB); Paul V. Brennan, Herts (GB); Philip S. Royston, Newbury (GB); Rajinder Bridgelall, Plano, TX (US)

(73) Assignee: Axcess International Inc., Addison, TX (US)

( * ) Notice: Subject to any disclaimer, the term of this patent is extended or adjusted under 35 U.S.C. 154(b) by 728 days.

(21) Appl. No.: 11/747,700

(22) Filed: May 11, 2007

(65) Prior Publication Data
US 2008/0042850 A1 Feb. 21, 2008

Related U.S. Application Data

(60) Provisional application No. 60/747,032, filed on May 11, 2006.

(51) Int. Cl.
*G08B 13/14* (2006.01)
(52) U.S. Cl. .................. 340/572.7; 340/572.1
(58) Field of Classification Search ............... 340/572.1, 340/0.7, 0.8, 10.1, 539.1
See application file for complete search history.

(56) References Cited

U.S. PATENT DOCUMENTS

| | | | |
|---|---|---|---|
| 3,811,008 A | 5/1974 | Lee | |
| 3,868,640 A | 2/1975 | Binnie et al. | |
| 4,217,588 A | 8/1980 | Freeny, Jr. | |
| 4,281,354 A | 7/1981 | Conte | |
| 4,303,910 A | 12/1981 | McCann | |
| 4,385,231 A | 5/1983 | Mizutani et al. | |
| 4,449,189 A | 5/1984 | Feix et al. | |

(Continued)

FOREIGN PATENT DOCUMENTS

BE 1006392 9/1994

(Continued)

OTHER PUBLICATIONS

Unknown, "Radio Frequency Identification (RFID)—Standards, Common Applications, A Look Ahead, and Recommended Reading," http://www.aimglobal.org/techinfo/rfid/rfidintro.html, 4, Printed Jun. 7, 1999.

(Continued)

*Primary Examiner*—Jeffery Hofsass
(74) *Attorney, Agent, or Firm*—Fay Kaplun & Marcin, LLP

(57) ABSTRACT

In certain embodiments, a hybrid radio frequency identification (RFID) tag includes circuitry, a battery, and a first antenna. The circuitry includes one or more passive RFID elements and one or more semi-active RFID elements operable to transmit and receive communications to and from one or more RFID tag tracking systems. The battery is coupled to the one or more semi-active elements. The first antenna is coupled to the passive RFID elements and to the semi-active RFID elements, the first antenna comprising a shape that defines a first open area and a second open area. The circuitry is positioned within one of the first and second open areas defined by the shape of the first antenna, and the battery is positioned within the other of the first and second open areas defined by the shape of the first antenna.

36 Claims, 2 Drawing Sheets

U.S. PATENT DOCUMENTS

| | | |
|---|---|---|
| 4,458,266 A | 7/1984 | Mahoney |
| 4,459,474 A | 7/1984 | Walton |
| 4,471,345 A | 9/1984 | Barrett, Jr. |
| 4,528,663 A | 7/1985 | Citta |
| 4,598,275 A | 7/1986 | Ross et al. |
| 4,654,793 A | 3/1987 | Elrod |
| 4,656,463 A | 4/1987 | Anders et al. |
| 4,672,374 A | 6/1987 | Desjardins |
| 4,675,656 A | 6/1987 | Narcisee |
| 4,691,202 A | 9/1987 | Denne et al. |
| 4,774,570 A | 9/1988 | Araki |
| 4,777,526 A | 10/1988 | Saitoh et al. |
| 4,822,990 A | 4/1989 | Tamada et al. |
| 4,831,438 A | 5/1989 | Bellman, Jr. et al. |
| 4,833,807 A | 5/1989 | McLean |
| 4,862,160 A | 8/1989 | Ekchian et al. |
| 4,864,292 A | 9/1989 | Nieuwkoop |
| 4,951,147 A | 8/1990 | Aknar et al. |
| 4,955,038 A | 9/1990 | Lee et al. |
| 5,006,983 A | 4/1991 | Wayne et al. |
| 5,030,807 A | 7/1991 | Landt et al. |
| 5,051,741 A | 9/1991 | Wesby |
| 5,086,480 A | 2/1992 | Sexton |
| 5,109,278 A | 4/1992 | Erickson et al. |
| 5,111,291 A | 5/1992 | Erickson et al. |
| 5,153,878 A | 10/1992 | Krebs |
| 5,175,729 A | 12/1992 | Borras et al. |
| 5,202,759 A | 4/1993 | Laycock |
| 5,206,639 A | 4/1993 | Kames |
| 5,220,557 A | 6/1993 | Kelley |
| 5,227,803 A | 7/1993 | O'Connor et al. |
| 5,229,850 A | 7/1993 | Toyoshima |
| 5,237,408 A | 8/1993 | Blum et al. |
| 5,266,925 A | 11/1993 | Vercellotti et al. |
| 5,272,476 A | 12/1993 | McArthur et al. |
| 5,287,269 A | 2/1994 | Dorrough et al. |
| 5,289,369 A | 2/1994 | Hirshberg |
| 5,305,008 A | 4/1994 | Turner et al. |
| 5,321,396 A | 6/1994 | Lamming et al. |
| 5,351,052 A | 9/1994 | D'Hont et al. |
| 5,371,899 A | 12/1994 | Kuznicki et al. |
| 5,408,330 A | 4/1995 | Squicciarini et al. |
| 5,416,468 A | 5/1995 | Baumann |
| 5,423,574 A | 6/1995 | Forte-Pathroff |
| 5,425,032 A | 6/1995 | Shloss et al. |
| 5,432,864 A | 7/1995 | Lu et al. |
| 5,448,242 A | 9/1995 | Sharpe et al. |
| 5,450,087 A | 9/1995 | Hurta et al. |
| 5,450,492 A | 9/1995 | Hook et al. |
| 5,453,747 A | 9/1995 | D'Hont et al. |
| 5,455,575 A | 10/1995 | Schuermann |
| 5,471,212 A | 11/1995 | Sharpe et al. |
| 5,488,376 A | 1/1996 | Hurta et al. |
| 5,491,471 A | 2/1996 | Stobbe |
| 5,502,806 A | 3/1996 | Mahoney et al. |
| 5,519,381 A | 5/1996 | Marsh et al. |
| 5,523,737 A | 6/1996 | Luna |
| 5,525,992 A | 6/1996 | Froschermeier |
| 5,525,994 A | 6/1996 | Hurta et al. |
| 5,526,133 A | 6/1996 | Paff |
| 5,528,232 A | 6/1996 | Verma et al. |
| 5,539,394 A | 7/1996 | Cato et al. |
| 5,541,928 A | 7/1996 | Kobayashi et al. |
| 5,565,858 A | 10/1996 | Guthrie |
| 5,566,327 A | 10/1996 | Sehr |
| 5,576,838 A | 11/1996 | Renie |
| 5,581,297 A | 12/1996 | Koz et al. |
| 5,589,873 A | 12/1996 | Natori et al. |
| 5,621,412 A | 4/1997 | Sharpe et al. |
| 5,629,981 A | 5/1997 | Nerlikar |
| 5,633,875 A | 5/1997 | Hershey et al. |
| 5,640,151 A | 6/1997 | Reis |
| 5,668,803 A | 9/1997 | Tymes et al. |
| 5,684,828 A | 11/1997 | Bolan et al. |
| 5,686,902 A | 11/1997 | Reis et al. |
| 5,689,442 A | 11/1997 | Swanson et al. |
| 5,694,162 A | 12/1997 | Freeny, Jr. |
| 5,694,514 A | 12/1997 | Evans et al. |
| 5,721,733 A | 2/1998 | Wang et al. |
| 5,729,695 A | 3/1998 | Ahlm et al. |
| 5,737,330 A | 4/1998 | Fullthorp et al. |
| 5,742,237 A | 4/1998 | Bledsoe |
| 5,745,037 A | 4/1998 | Guthrie et al. |
| 5,748,908 A | 5/1998 | Yu |
| 5,754,541 A | 5/1998 | Glisic et al. |
| 5,774,459 A | 6/1998 | Charrat |
| 5,797,126 A | 8/1998 | Helbling et al. |
| 5,804,810 A | 9/1998 | Wolley et al. |
| 5,805,082 A | 9/1998 | Hassett |
| 5,808,587 A | 9/1998 | Shima |
| 5,811,772 A | 9/1998 | Lucero |
| 5,813,912 A | 9/1998 | Shultz |
| 5,818,915 A | 10/1998 | Hayes et al. |
| 5,822,714 A | 10/1998 | Cato |
| 5,837,982 A | 11/1998 | Fujoka |
| 5,839,058 A | 11/1998 | Phillips et al. |
| 5,841,365 A | 11/1998 | Rimkus |
| 5,842,131 A | 11/1998 | Yamane |
| D403,392 S | 12/1998 | Briggs et al. |
| 5,848,395 A | 12/1998 | Edgar et al. |
| 5,856,931 A | 1/1999 | McCasland |
| 5,857,152 A | 1/1999 | Everett |
| 5,866,890 A | 2/1999 | Neuner |
| 5,867,823 A | 2/1999 | Richardson |
| 5,870,029 A | 2/1999 | Otto et al. |
| 5,870,459 A | 2/1999 | Phillips et al. |
| 5,872,887 A | 2/1999 | Walker |
| 5,874,902 A | 2/1999 | Heinrich et al. |
| D406,871 S | 3/1999 | Briggs |
| D407,133 S | 3/1999 | Briggs |
| 5,880,453 A | 3/1999 | Wang et al. |
| 5,886,634 A | 3/1999 | Muhme |
| 5,892,454 A | 4/1999 | Schipper et al. |
| 5,894,589 A | 4/1999 | Reber et al. |
| 5,903,321 A | 5/1999 | Tung et al. |
| 5,918,211 A | 6/1999 | Sloane |
| 5,929,778 A | 7/1999 | Asama et al. |
| 5,932,869 A | 8/1999 | Gottlich et al. |
| 5,936,583 A | 8/1999 | Sekine et al. ............... 343/702 |
| 5,940,006 A | 8/1999 | MacLellan et al. |
| 5,942,987 A | 8/1999 | Heinrich et al. |
| 5,946,444 A | 8/1999 | Evans et al. |
| 5,946,613 A | 8/1999 | Hayes, Jr. et al. |
| 5,956,259 A | 9/1999 | Hartsell, Jr. et al. |
| 5,959,277 A | 9/1999 | Lucero |
| 5,966,068 A | 10/1999 | Wicks et al. |
| 5,966,654 A | 10/1999 | Croughwell et al. |
| 5,973,613 A | 10/1999 | Reis et al. |
| 5,978,770 A | 11/1999 | Waytena et al. |
| 5,978,821 A | 11/1999 | Freeny |
| 5,987,421 A | 11/1999 | Chuang |
| 6,003,013 A | 12/1999 | Boushy et al. |
| 6,028,626 A | 2/2000 | Aviv |
| 6,034,603 A | 3/2000 | Steeves |
| 6,061,344 A | 5/2000 | Wood, Jr. |
| 6,127,928 A | 10/2000 | Issacman et al. |
| 6,130,623 A | 10/2000 | MacLellan et al. |
| 6,154,137 A | 11/2000 | Goff et al. ................ 340/572.4 |
| 6,232,877 B1 | 5/2001 | Ashwin |
| 6,271,752 B1 | 8/2001 | Vaios |
| 6,275,476 B1 | 8/2001 | Wood, Jr. |
| 6,294,953 B1 | 9/2001 | Steeves |
| 6,385,772 B1 | 5/2002 | Courtney |
| 6,433,683 B1 | 8/2002 | Robinson |

| | | |
|---|---|---|
| 6,456,321 B1 | 9/2002 | Ito et al. |
| 6,460,069 B1 | 10/2002 | Berlin et al. |
| 6,462,660 B1 | 10/2002 | Cannon et al. |
| 6,570,487 B1 | 5/2003 | Steeves |
| 6,570,498 B1 | 5/2003 | Frost et al. |
| 6,686,829 B1 | 2/2004 | Hohberger et al. |
| 7,005,985 B1 | 2/2006 | Steeves |
| 7,271,727 B2 | 9/2007 | Steeves |
| 7,286,158 B1 | 10/2007 | Griebenow |
| 2001/0048361 A1 | 12/2001 | Mays et al. ............... 340/10.51 |
| 2003/0220711 A1 | 11/2003 | Allen |
| 2004/0008114 A1 | 1/2004 | Sawyer |
| 2004/0217865 A1 | 11/2004 | Turner ..................... 340/572.7 |
| 2004/0233040 A1 | 11/2004 | Lane et al. ................. 340/5.86 |
| 2005/0088286 A1 | 4/2005 | Heinrich et al. |
| 2005/0169345 A1 | 8/2005 | Urbas et al. |
| 2006/0013070 A1 | 1/2006 | Holm et al. |
| 2006/0066444 A1 | 3/2006 | Steeves |
| 2006/0071756 A1 | 4/2006 | Steeves |
| 2006/0140374 A1 | 6/2006 | Light et al. |
| 2007/0159338 A1 | 7/2007 | Beber |
| 2007/0205896 A1 | 9/2007 | Beber |
| 2007/0285241 A1 | 12/2007 | Griebenow |
| 2008/0042850 A1 | 2/2008 | DeWitte |

FOREIGN PATENT DOCUMENTS

| | | |
|---|---|---|
| DE | 298 15 797 UI | 10/1998 |
| EP | 0 161 779 | 11/1985 |
| EP | 0 221 631 | 5/1987 |
| EP | 0 245 555 | 11/1987 |
| EP | 0 467 036 | 1/1992 |
| EP | 0 565 046 | 10/1993 |
| EP | 0 781 049 | 6/1997 |
| GB | 2 187 317 | 9/1987 |
| GB | 2 250 156 | 5/1992 |
| GB | 2 295 065 | 5/1996 |
| GB | 2 307 324 | 5/1997 |
| WO | WO 88/04082 | 6/1988 |
| WO | WO 90/01838 | 2/1990 |
| WO | WO 91/17515 | 11/1991 |
| WO | WO 93/04537 | 3/1993 |
| WO | WO 95/12858 | 5/1995 |
| WO | WO 95/22138 | 8/1995 |
| WO | WO 96/03839 | 2/1996 |
| WO | WO 96/27864 | 12/1996 |
| WO | WO 98/10358 | 3/1998 |
| WO | WO 98/11520 | 3/1998 |

OTHER PUBLICATIONS

AIM International, Inc., "Radio Frequency Identification RFID—A Glossary: AIM International WP-98/001R," http://www.aimglobal.org/techinfo/rfid/aimrfidglossary, Printed Jun. 7, 1999.

AIM International, Inc., "Radio Frequency Identification RFID—A Basic Primer: AIM International WP-98/002R," http://www.aimglobal.org/techinfo/rfid/aimrfidbasics.htm, Printed Jun. 7, 1999.

International Search Report, Application No. PCT/US01/14467, 7 pages, Mailed Sep. 13, 2001.

International Search Report, Application No. PCT/US00/42802, 12 pages, Mailed Apr. 8, 2002.

International Search Report, Application No. PCT/US00/05772, 8 pages, Mailed Jul. 14, 2000.

International Search Report, Application No. PCT/US00/33569, 6 pages, Mailed Apr. 5, 2001.

Boehringer, "Integrated Security System and Method," U.S. Appl. No. 09/569,523, filed May 12, 2000 127.

Steeves, "Method and System for Networking Radio Tags in a Radio Frequency Identification System," U.S. Appl. No. 11/270,696, filed Nov. 9, 2005 229.

Beber et al., "Hybrid Radio Frequency Identification (RFID) Tag System," U.S. Appl. No. 11/615,743, filed Dec. 22, 2006 230.

Beber et al., "System and Method for Determining Location, Directionality, and Velocity of RFID Tags," U.S. Appl. No. 11/681,560, filed Mar. 2, 2007 231.

Griebenow et al., "Multi-Tag Tracking Systems and Methods," U.S. Appl. No. 11/688,681, filed Mar. 20, 2007 232.

PCT Notification of Transmittal of the International Search Report and the Written Opinion of the International Searching Authority, or the Declaration, mailed Jun. 17, 2008, in re PCT/US 07/06836 filed Mar. 20, 2007 (11 pages).

PCT Notification of Transmittal of the International Search Report and the Written Opinion of the International Searching Authority, or the Declaration, mailed Sep. 22, 2008, in re PCT/US 06/049191 filed Dec. 22, 2006 (8 pages).

PCT Notification of Transmittal of the International Search Report and the Written Opinion of the International Searching Authority, or the Declaration, mailed Sep. 25, 2008, in re PCT/US 07/11423 filed May 11, 2007 (8 pages).

Selected pages regarding Savi Technology, Inc., a Lockheed Martin Company; "*Savi Technology's Nested Visibility*"; obtained from http://www.savi.com/; 2 pages, Last visited Jan. 2008.

Selected pages regarding Savi Technology, Inc., a Lockheed Martin Company; "*Savi Products and Technology Overview*"; obtained from http://www.savi.com/products/; 2 pages, Last visited Jan. 2008.

PCT Notification of Transmittal of the International Search Report and the Written Opinion of the International Searching Authority, or the Declaration, mailed Oct. 21, 2008, in re PCT/US07/05497, 7 pages.

RADIO FREQUENCY IDENTIFICATION (RFID) TAG ANTENNA DESIGN

RELATED APPLICATION

This application claims the benefit under 35 U.S.C. §119(e) of U.S. Provisional Application No. 60/747,032, entitled "RFID Tag Antenna Design," filed on May 11, 2006.

TECHNICAL FIELD

This invention relates in general to radio frequency identification (RFID) systems, and more particularly to an RFID tag antenna design.

BACKGROUND

The management and tracking of personnel, assets, and other objects is required in a wide variety of environments and is often cumbersome, labor intensive, and expensive. Radio receivers and transmitters have been used for many years to identify personnel and objects in such environments. For example, many systems are known for attaching radio tags to items, such as personnel, assets, and automobiles. When automobiles equipped with radio tags enter a certain area, such as a toll booth area, the automobiles are automatically identified. The appropriate tolls are deducted from corresponding accounts, thereby eliminating the need for drivers to stop and make payments at toll booths. When radio tags are place on personnel, they can be automatically identified and checked for authorized entry to a facility in a security application called access control. Assets which are tagged can be identified and tracked as they move throughout a facility for the purposes of automatically locating them. They can also be automatically counted therefore providing inventory control. They can also be protected as when an asset approaches an exit doorway the system can automatically determine if the asset is authorized to be removed from the facility. Tagged vehicles, assets, and personnel can be linked logically in the system to enable greater visibility and control.

RFID systems generally use a fixed position transmitter capable of reading remote, portable tags attached to personnel, assets, or other objects. Because of power consumption concerns and the life span of the tag, the radio tag often operates only after receiving a wake-up signal, often called semi-active operation. The wake-up signal is generated by a powered device called an activator which transmits the desired signal through a specially designed antenna based upon the physical properties of the area. Activation causes the tag to leave a low power, or sleep state and enter an active state. The activation transmitter produces the wake-up signal, and an antenna transmits the wake-up signal to a particular area.

Although semi-active radio tags are common, many applications alternatively use passive radio tags. Passive tags are tags that do not contain a battery. Instead, power for the tag is supplied by the tag reader (radio waves from the reader cause a magnetic field to be formed around the antenna of the tag, and the field is used to energize the circuits in the tag). One particular application of passive radio tags is in association with the EPCglobal standard. The EPC standard pairs the use of RFID systems with electronic product codes (EPCs) for management of high volume consumer package goods. This standard is effective at automatically identifying pallets, cartons, and individual items as they enter a warehouse facility via an entry/exit door portal. The current standard is limited in its use and reliability because the passive RFID system solution requires substantial tag activation electronics to be located proximate to the tagged goods in order for the tag to have enough reflective energy for the signal to be read and in order for the system to be reliable. Furthermore, careful orientation of tag to reader is a paramount concern in order to achieve reasonable performance. The result is a limited tag-to-reader range.

SUMMARY

According to the present invention, disadvantages and problems associated with previous and existing RFID tag antennas may be reduced or eliminated.

In certain embodiments, a hybrid radio frequency identification (RFID) tag includes circuitry, a battery, and a first antenna. The circuitry includes one or more passive RFID elements and one or more semi-active RFID elements operable to transmit and receive communications to and from one or more RFID tag tracking systems. The battery is coupled to the one or more semi-active elements. The first antenna is coupled to the passive RFID elements and to the semi-active RFID elements, the first antenna comprising a shape that defines a first open area and a second open area. The circuitry is positioned within one of the first and second open areas defined by the shape of the first antenna, and the battery is positioned within the other of the first and second open areas defined by the shape of the first antenna.

Particular embodiments of the present invention may provide one or more technical advantages. In certain embodiments, the present invention provides an antenna that is operable to provide for communication over multiple frequency bands. For example, the antenna may be operable to provide for communication over each of the following frequency bands: 315 MHz, 433 MHz, and 860 MHz to 960 MHz. In certain embodiments, the antenna may be shared by various RFID elements of circuitry for an RFID tag to provide communication on a number of frequency bands. In certain embodiments, in the case in which the active and passive components of a hybrid tag communicate in a similar frequency range (for example, such a tag may transmit and receive in the EPCglobal frequency range—860-960 MHz—and may also communicate in typical active tag frequencies—such as around 900 MHz), a single antenna may be shared by both of these components. The shape of the antenna and its arrangement with respect to the other components of the tag may be designed so as to minimize the overall size of the tag and to optimize the radio-frequency performance of the antenna. In certain embodiments, the antenna is designed to be robust and easy to manufacture in that it is designed not to be overly sensitive to production variation in the form of different substrate thicknesses and resin mixes, and different track thicknesses (e.g., copper track thicknesses).

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and its advantages, reference is made to the following descriptions, taken in conjunction with the accompanying drawings, in which.

DESCRIPTION OF EXAMPLE EMBODIMENTS

Figure 1A:
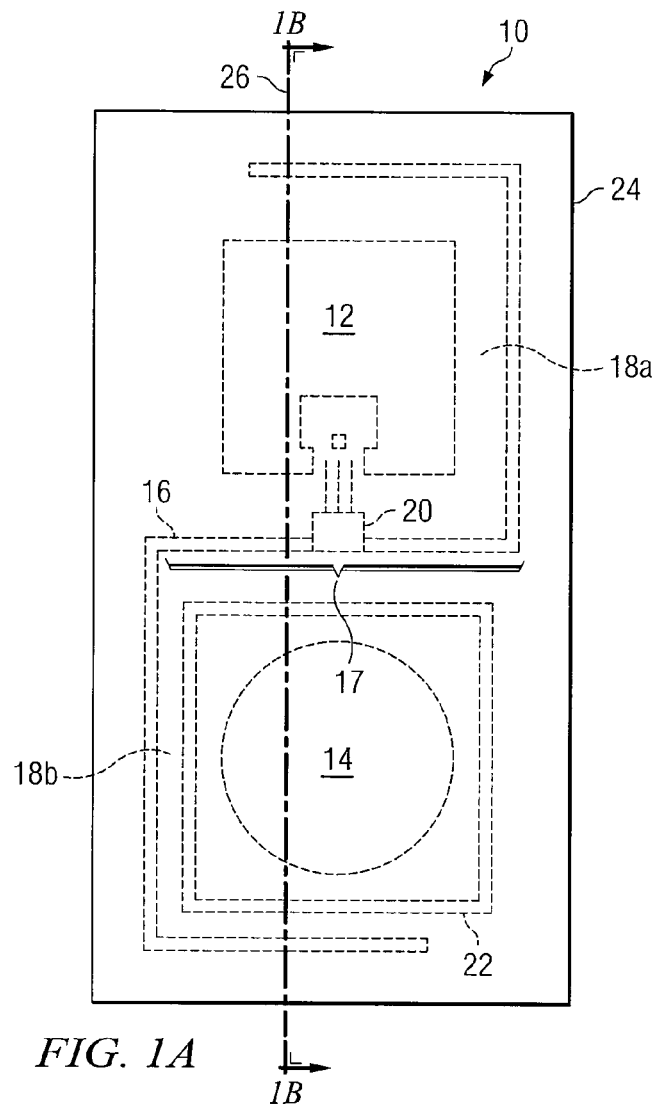
FIGS. 1A-1B illustrate top and cross-sectional views, respectively, of an example radio frequency identification (RFID) tag that includes a substantially S-shaped antenna designed according to certain embodiments of the present invention.
Figure 1B:
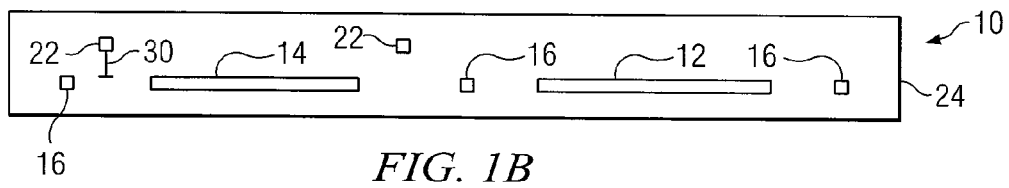

FIGS. 1A-1B illustrate top and cross-sectional views, respectively, of an example radio frequency identification (RFID) tag that includes a substantially S-shaped antenna designed according to certain embodiments of the present invention. Although a particular embodiment is illustrated and primarily described with respect to FIGS. 1A and 1B, the present invention contemplates any suitable embodiment of tag 10.

Referring to FIG. 1A, tag 10 includes circuitry 12, which may include one or more integrated circuits for providing RFID functionality. In certain embodiments, circuitry 12 comprises one or more passive RFID elements and one or more semi-active RFID elements operable to transmit and receive communications to and from one or more RFID tag tracking systems. In certain embodiments, circuitry 12 may include one or more active RFID elements. A tag that includes this type of circuitry 12 that implements multiple types of RFID technology (e.g., a combination of passive, semi-active, and active) may be referred to as a hybrid tag. Antenna designs described herein may be used with hybrid tags or any other suitable type of RFID tags.

Passive tags cannot provide accurate inventory accounting of goods that require a longer read range. Furthermore, these tags also cannot independently provide sensing information. They also cannot independently provide theft protection, tracking, or static inventory counting.

These functions may be obtained in certain circumstances using active tags. Active tags use batteries to provide regular beacon signals for automatic identification at long ranges using a flexible receiver infrastructure. Alternatively, semi-active tags may also be used. Such semi-active tags may be awakened using low cost open air tag activation at lower RF frequencies (such as 126 KHz) so that the tag does not have to constantly transmit and can therefore preserve its battery strength. However, active tags and semi-active tags cannot economically provide high volume portal accounting, such as the management of goods under the EPCglobal standard. When combined into a single RFID tag, however, various elements of passive, semi-active, and active RFID tags can provide benefits beyond the individual capabilities of each type of tag. One example of such a hybrid tag is illustrated in FIG. 1. Although such a tag has many uses, it may be particularly useful in association with an EPCglobal network.

By adding battery power to the passive tag, items with tags that move through a passive tag wake-up field can have their tags pre-programmed and their circuits pre-charged for a faster and stronger return signal using the power of the onboard battery. Improved EPC portal reliability results particularly with items for which the use of passive tags is problematic, such as metal containers or containers holding fluids, items where the tag is angled away from the direct line of sight of the reader, and/or items where tags are not directly in line with the reader.

It may be desirable for circuitry 12 to send and/or receive data/signals on a number of frequency bands. For example, the active and passive elements of tag 10 may communicate in a similar frequency range (for example, such a tag may transmit and receive in the EPCglobal frequency range—860-960 MHz—and may also communicate in typical active tag frequencies—such as around 900 MHz). For example, circuitry 12 may comprise a multi-mode low power RF microcircuit with a sensor interface targeted at RFID applications. Circuitry 12 may be capable of operation in the 860-960 MHz band, as both a receiver and passive transmitter. Depending on the application, circuitry 12 may be used to actively transmit in any of three separate frequency bands (315 MHz, 434 MHz, or 902-928 MHz). In a particular embodiment, circuitry 12 comprises a single integrated circuit operable to provide a suitable combination of active RFID operation, semi-active RFID operation, and passive RFID operation. A particular example of circuitry 12 that may be used is the AIKMAN integrated circuit manufactured and sold by ACCESS INTERNATIONAL, INC. A particular example of circuitry 12 that may be used is described in co-pending U.S. patent application Ser. No. 11/615,743, filed Dec. 22, 2006, and entitled "Hybrid Radio Frequency Identification (RFID) Tag System."

Tag 10 may include a battery 14 operable to supply power to semi-active and or active RFID elements of circuitry 12. In certain embodiments, battery 14 is coupled to the one or more semi-active or active elements of circuitry 12. This coupling may be provided in any suitable manner such that battery 14 is able to supply power to the active and/or semi-active RFID elements of circuitry 12. In certain embodiments, battery 14 is implemented with a battery holder to allow battery 14 to be changed. Although described as a battery, the present invention contemplates tag 10 including any other suitable type of power source.

Tag 10 includes a first antenna 16. Antenna 16 is operable to provide electromagnetic transfer of information between RFID circuitry 12 and a tag tracking system (e.g., a tag reader or interrogation device). In general, antenna 16 is operable to provide for communication over multiple frequency bands. For example, antenna 16 may be an antenna that is shared by the various RFID elements of circuitry 12 to provide communication on a number of frequency bands. The shape of antenna 16 and its arrangement with respect to the other components of tag 10 may be designed so as to minimize the overall size of tag 10 and to optimize the radio-frequency performance of antenna 16.

Antenna 16 may be coupled to the passive RFID elements and to the semi-active RFID elements of circuitry 12 (as well as to the active RFID elements, if appropriate). A shape of antenna 16 may define a first open area 18a and a second open area 18b. A portion 17 of antenna 16 may separate circuitry 12 from battery 14.

In the particular embodiment illustrated in FIGS. 1A and 1B, antenna 16 is substantially S-shaped, this particular example being a reverse S-shape. An additional example embodiment for antenna 16 according to the present invention is described below with reference to FIG. 2. The designs for antenna 16 contemplated by the present invention generally include first and second open areas 18 created by the design of the antenna, circuitry 12 being in one of the first and second open areas 18 and battery 14 being in the other of the first and second open areas 18. First and second areas 18 may be substantially separated by one or more portions of the antenna (e.g., portion 17 of antenna 16). First and second open areas 18 may or may not be the same size.

In certain embodiments, the substantially S-shape of antenna 16 (and other shapes described herein, as well as others contemplated by the present invention) may make good use of the available tag area on a surface of tag 10, fitting neatly around circuitry 12 and battery 14. The substantially S-Shape of antenna 16 may also substantially maximize the effective aperture of antenna 16. The effective aperture of an antenna, sometimes referred to as the capture area, is the frontal area from which a receiving antenna extracts energy from passing electromagnetic waves. The effective aperture of an antenna is typically larger than the physical size of the antenna.

Antenna 16 may comprise copper, aluminum, silver, or any other suitable conductive material for use in an antenna. For example, antenna 16 may be implemented as copper (or another suitable conductive material) tracks on a two-layer printed circuit board. In certain embodiments, antenna 16 is a dipole antenna. For example, antenna 16 may be an ultra-high frequency (UHF) dipole antenna. In certain embodiments, antenna 16 is broadly omni-directional with no specific polarization.

Antenna 16 may be operable to communicate in multiple frequency ranges. In a particular example, antenna 16 is operable to communicate in each of the 315 MHz frequency range, the 434 MHz frequency range, and the 860 MHz to 928 MHz frequency range. Although tag 10 and its antenna 16 have been described as communicating on particular example frequency bands, the present invention contemplates tag 10 communicating on any suitable combination of frequency bands and antenna 16 facilitating communication on those frequency bands. The size of antenna 16 (i.e., its length, width, and thickness) depends on the requirements of a particular application.

Tag 10 may include an inductive element 20, which may be implemented as a printed line. In certain embodiments, inductive element 20 may be an inductive antenna tuning loop. Inductive element 20 may be operable to perform certain antenna matching functions for tag 10. For example, inductive element 20 may match a transceiver with a fixed impedance (e.g., 50 ohms) to a load (feed line and antenna) impedance that is unknown, complex, or otherwise does not match. The particular implementation of inductive element 20 may vary according to the desired application; however, in certain embodiments, inductive element 20 element may be approximately 6 mm to approximately 8 mm in length. The larger size (e.g., 8 mm) may result in a lower resonant frequency for antenna 16, and by selecting an appropriate tuning capacitor value (e.g., 5.6 to 6.8 pF) and location, the frequency range of 860 MHz to 928 MHz may be achievable.

In certain embodiments, tag 10 includes a low frequency (LF) antenna element 22. For example, LF antenna element 22 may be an LF coil antenna. As a particular example, the LF coil antenna may comprise a single conductive loop. LF antenna element 22 may be used as part of a low frequency (e.g., 126 KHz) transponder. LF antenna element 22 (e.g., LF coil antenna) may provide magnetic (126 kHz) capability to energize a portion or all of circuitry 12 of tag 10. The magnetization may be initiated by radio waves generated by a tag reader of a tag tracking system. This magnetization function may be performed through an inductive transfer of electrical power from an outside device to circuitry 12.

Locating LF antenna element 22 away from the track of antenna 16 may be desirable, as this may result in less interaction between antenna 16 and LF antenna element 22. In certain embodiments, LF antenna element 22 (e.g., an LF coil antenna) is located in one of open areas 18 (from a top-view perspective) created by antenna 16. For example, LF antenna element 22 may be located such that it substantially surrounds (from a top-view perspective) circuitry 12 or battery 14 in the open area 18 in which circuitry 12 or battery 14 is located. In the illustrated example, LF antenna element 22 substantially surrounds (from a top-view perspective) battery 14 in open area 18b. The location of LF antenna element 22 in one of open areas 18 (from a top-view perspective) may help minimize negative effects due to the presence of both antenna 16 and LF antenna element 22.

Although illustrated as a rectangle surrounding battery 14, LF antenna element 22 may take any suitable shape (e.g., a shape substantially conforming to the shape of the element (e.g., circuitry 12 or battery 14 that LF antenna element 22 is surrounding) according to particular needs. In certain embodiments, LF antenna element 22 may be positioned 2 mm above the plane of antenna 16, although the present invention is not intended to be limited to such embodiments.

Moreover, although a particular placement and size of LF antenna element 22 is illustrated and primarily described, the present invention contemplates any suitable size and placement for the LF antenna element 22. The size and placement of LF antenna element 22 may affect the performance of antenna 16. For example, a relatively large LF antenna element 22 (e.g., an LF antenna element 22 with a radius large enough that LF antenna element 22 extends, from a top-view perspective, beyond its associated open area 18 into the other open area 18) may have a significant affect on the performance of antenna 16 relative to a smaller LF antenna element 22, possibly lowering the resonant frequency of antenna 16 by more than 10% and compromising the impedance match of antenna 16. Thus, in certain embodiments, a relatively smaller LF antenna element 22 may be desirable, as it may be more compatible with antenna 16.

For example, a relatively large LF coil antenna (even at 2 mm spacing) may be undesirable for certain applications as the coil may appear as a short-circuited loop at 900 MHz and thus may act as a reflector, short-circuiting the E-field. Smaller LF coil antennas may have a reduced impact, and an LF coil antenna positioned around circuitry 12 (e.g., the PCB of circuitry 12) or battery 14 for example, may be more suitable. In certain embodiments, the reduced LF coil radius of the smaller LF coil may be compensated by using additional coil turns according to a square-law relationship (though, in certain embodiments, this may result in some loss of range performance). For example, for similar radiation resistance, a coil of half the radius may require four times the number of turns. In certain embodiments, using battery 14 as a chock may improve the performance of the LF coil antenna.

In certain embodiments, LF antenna element 22 is a single-layer, rectangular winding with the following characteristics: side A is 23 mm, side B is 27 mm, the length of the winding is 0.2 mm, and the number of turns is 207. These characteristics may result in 4.757 mH, which is within 1% of the 4.75 mH specification. However, the size of LF antenna element 22 (i.e., the coil diameter, thickness, and number of turns where LF antenna element 22 is a coil antenna) depends on the requirements of a particular application.

In certain embodiments, battery 14 may have a battery packaging. It may be desirable for the battery packaging to comprise a conductive material (e.g., metal), which may allow the battery packaging to be used as a magnetic field enhancing component. For example, the conductive material of the battery packaging may be operable to shape and enhance magnetic fields. This may be similar to the enhancing effect obtained from magnetic cores in transformers. Additionally or alternatively, the battery packaging may be used as part of the design for antenna 16. For example, the battery packaging may serve as a counterpoint for a monopole.

A portion or all of the components of tag 10 (e.g., circuitry 12, battery 14, antenna 16, inducer 20, and LF antenna element 22 may be formed and/or located on a common geometric plane. For example, the common geometric plane may comprise a common substrate 24. Substrate 24 may comprise any suitable medium on which the elements of tag 10 are formed or otherwise located. It should be noted that the present invention contemplates the elements of tag 10 being formed across a number of geometric planes (e.g., substrates 24) if appropriate. The PCB may comprise a Flame Resistant 4 (FR-4) PCB or any other suitable material.

Substrate 24 may have any suitable thickness, according to particular needs. As a particular example, substrate 24 may be approximately 0.8 mm. In certain embodiments, substrate 24 is a single-sided 0.8 mm thick FR4 PCB. The thickness of substrate 24 may affect the performance of antenna 16. A relatively thicker substrate 24 may tend to lower the resonant frequency of antenna 16. For example, doubling the thickness of the substrate 24 from 0.8 mm to 1.6 mm may lower the resonant frequency of antenna 16 by 55 MHz. This resonance may be tunable using different match components when retuning antenna 16 for different thicknesses of substrate 24. In certain embodiments, the resonance-reduction effect is linear, correlating to a variance of 6 MHz for a substrate thickness (of substrate 24) variance of 10%. In certain embodiments, antenna 16 is designed to be robust and easy to manufacture in that it is designed not to be overly sensitive to production variation in the form of different substrate 24 thicknesses and resin mixes, as well as different track thicknesses (e.g., copper track thicknesses).

In certain embodiments, tag 10 and its components may have the following dimensions. Tag 10 may have an area (as viewed from the top) of approximately 40 mm×73 mm. Circuitry 12 may have an area of approximately 30 mm×25 mm. Battery 14 may comprise a conductive disc (e.g., copper) having a diameter of approximately 18 mm. Although particular dimensions have been described for example purposes, the present invention contemplates tag 10 and its components comprising any suitable dimensions according to particular needs.

In some scenarios, tag 10 may be used to tag a metal container or other conductive surface. In certain embodiments, placing tag 10 in close proximity to a conductive surface may compromise the performance of antenna 16. For example, placing tag 10 in close proximity to a conductive surface may reduce the resonant frequency and impair the impedance match of antenna 16. This may be particularly true at 1 mm spacing between antenna 16 and the conductive surface. At 20 mm spacing, however, the performance of antenna 16 may be much improved. Spacing above 100 mm may have virtually no effect on the performance of antenna 16. Thus, in certain embodiments, a spacing of less than 2 cm may have a detrimental effect on the performance of antenna 16, while spacing of 10 cm or more may have virtually no effect on the performance of antenna 16.

As described briefly above, in certain embodiments, antenna 16 provides operation at a number of frequency bands. For example, antenna 16 may provide operation in the 860 MHz to 928 MHz frequency range. As another example, example, with no further matching, antenna 16 may also achieve gains of −7 dBi at both 315 MHz and 433 MHz. Thus, antenna 16 may be a single antenna shared for all three bands (e.g., 315 MHz, 433 MHz, and 860 MHz to 928 MHz). For example, antenna 16 may be used in both the EPC (860 MHz to 928 MHz) band (where they may be efficient) and, with little or no additional matching, in the 315 MHz and 434 MHz bands. In certain embodiments, while antenna 16 may be somewhat inefficient at the lower frequency bands, it may offer some functionality as the matching section is low-pass and so it will provide a low impedance connection to the antenna structure.

Antenna 16 may be reasonably tolerant of matching component values. In certain embodiments, antenna 16 is operable to achieve a bandwidth of 60 MHz. In certain embodiments, to optimize performance for the 860 MHz to 928 MHz portion of the frequency band, some adjustment of the matching component value and location may be made. Antenna 16 may achieve a bandwidth (to −6 dB return loss) of 860 MHz to 928 MHz. In certain embodiments, the presence of battery 14 may lower the resonant frequency of antenna 16 by around 2 MHz.

Referring to FIG. 1B, a cross-sectional view of example tag 10 of FIG. 1A is illustrated. The cross section of tag 10 is sliced at dashed line 26 of FIG. 1, as viewed from the right. The elements of tag 10 in FIG. 1B are labeled with the same reference numerals as were used in FIG. 1A.

For simplification, LF antenna element 22 is illustrated as a rectangular shape in the cross-section view. It will be understood that in certain embodiments, such as embodiments in which LF antenna element 22 is an antenna coil, LF antenna element 22 may be more appropriately viewed from the cross-section perspective as a number of layers each associated with a corresponding turn of the coil. As can be seen, in this example, LF antenna element 22 is positioned "above" the plane of other elements of tag 10. In certain embodiments, a suitable distance between the LF antenna element 22 and the plane of antenna 16 is approximately 2 mm (as indicated at reference numeral 30). However, the present invention is not intended to be so limited. For example, LF antenna element 22 may include a coil that is etched or printed into substrate 24, and a portion of the coil may not be above the plane of other elements of tag 10. Moreover, although a single substrate layer of substrate 24 is illustrated, the present invention contemplates tag 10 including any suitable number and types of substrate layers 24.

Figure 2:
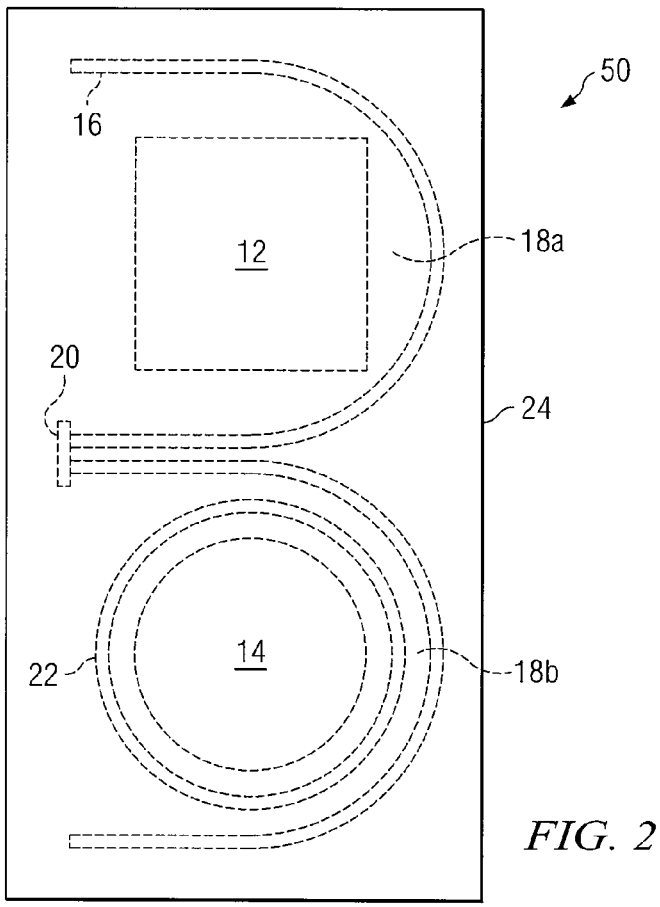
FIG. 2 illustrates a top view of another example RFID tag that includes a substantially W- or M-shaped antenna designed according to certain embodiments of the present invention.

FIG. 2 illustrates a top view of another example RFID tag 50 that includes a substantially W-or M-shaped antenna 16 designed according to certain embodiments of the present invention. For purposes of simplicity, antenna 16 will be referred to as M-shaped with reference to FIG. 2, but one can see that it is simply a matter of perspective whether the shape of antenna 16 is described as W-shaped or M-shaped. The M-shape of antenna 16 provides another example embodiment of an antenna according to the present invention. M-shaped antenna 16 may share many if not all of the same properties described above with reference to S-shaped antenna 16 (other than its shape).

M-shaped antenna 16 includes first and second open areas 18 created by the design of the antenna, circuitry 12 being in one of the first and second open areas 18 and battery 14 being in the other of the first and second open areas 18. First and second areas 18 may be substantially separated by one or more portions of the antenna (e.g., portion 20 of antenna 16). First and second open areas 18 may or may not be the same size. In certain embodiments, tag 50 is particularly useful for EPC applications.

Figure 3:
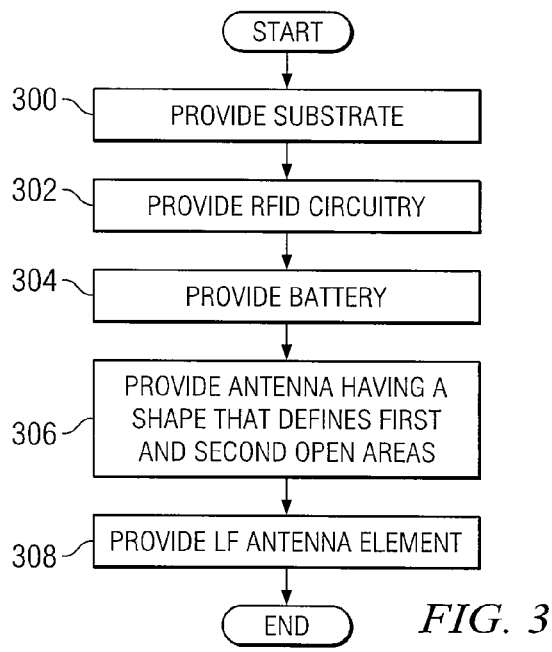
FIG. 3 illustrates an example method for forming an RFID tag with an antenna designed according to certain embodiments of the present invention.

FIG. 3 illustrates an example method for forming an RFID tag 10 with an antenna 16 designed according to certain embodiments of the present invention. In general, the steps may be implemented using standard tag fabrication techniques to implement the novel design of the present invention.

For example, tag 12 may be formed using suitable deposition, masking, doping, and etching techniques. The elements of tag 10 (e.g., circuitry 12, battery 14, antenna 16, inductive element 20, LF antenna element 20, or other suitable elements of tag 10) may be fabricated separately from one another and assembled using an appropriate fabrication technique. Alternatively, a portion or all of the elements of tag 10 may be fabricated using a relatively unified fabrication process. Although the method is described primarily with respect to RFID tag 10, the present invention contemplates the method being used to form tag 50 or any other suitable type of tag, according to particular needs.

At step 300, substrate 24 may be provided. The forming of substrate 24 may be accomplished in any suitable manner and may include forming one or more tracks or vias in the surface of substrate 24. For example, a track for depositing one or more conductive materials to be antenna 16 may be formed according to a design of the present invention. The design may be an S-shape, M-shape (or W-shape), or any other suitable shape that includes first and second open areas 18, as well as a portion of the track separating the first and second open areas 18. These tracks may provide locations for antenna 16, battery 14, and other suitable elements of tag 10.

At step 302, RFID circuitry 12 may be provided. RFID circuitry 12 may include one or more integrated circuits for RFID functionality. In certain embodiments, RFID circuitry 12 is operable to implement a hybrid RFID tag 10 that is capable of providing, in any suitable combination, passive, semi-active, and active RFID operation. At step 304, battery 14 may be provided. Although described as a battery, the present invention contemplates use of any suitable type of power source. In a particular embodiment, battery 14 comprises a conductive disc (e.g., a copper disc).

At step 306, antenna 16 may be provided. For example, antenna 16 may be provided by depositing a suitable conductive material in the track formed in step 300. Antenna 16 may have a suitable shape (e.g., a substantially S-shape, W-shape, M-shape, or other suitable shape) defining first and second open areas. The first and second areas may be separated by a portion of antenna 16. Circuitry 12 may be located in one of the open areas, and battery 14 may be located in the other open area. In certain embodiments, one or more inductive elements may also be provided.

At step 308, an LF antenna element 22 may be provided. In certain embodiments, LF antenna element 22 (e.g., an LF coil antenna) is located in one of open areas 18 (from a top-view perspective) created by antenna 16. For example, LF antenna element 22 may be located such that it substantially surrounds (from a top-view perspective) circuitry 12 or battery 14 in the open area 18 in which circuitry 12 or battery 14 is located. In the illustrated example, LF antenna element 22 substantially surrounds (from a top-view perspective) battery 14 in open area 18b. The location of LF antenna element 22 in one of open areas 18 (from a top-view perspective) may help minimize negative effects due to the presence of both antenna 16 and LF antenna element 22.

Although a particular method has been described with reference to FIG. 3, the present invention contemplates any suitable method in accordance with the present invention. Thus, certain of the steps described with reference to FIG. 3 may take place substantially simultaneously and/or in different orders than as shown and described.

Particular embodiments of the present invention may provide one or more technical advantages. In certain embodiments, the present invention provides an antenna 16 that is operable to provide for communication over multiple frequency bands. For example, antenna 16 may be operable to provide for communication over each of the following frequency bands: 315 MHz, 433 MHz, and 860 MHz to 960 MHz. In certain embodiments, antenna 16 may be shared by various RFID elements of circuitry 12 for an RFID tag 10 to provide communication on a number of frequency bands. In certain embodiments, in the case in which the active and passive components of a hybrid tag communicate in a similar frequency range (for example, such a tag 10 may transmit and receive in the EPCglobal frequency range—860-960 MHz—and may also communicate in typical active tag frequencies—such as around 900 MHz), a single antenna 16 may be shared by both of these components. The shape of antenna 16 and its arrangement with respect to the other components of tag 10 may be designed so as to minimize the overall size of tag 10 and to optimize the radio-frequency performance of antenna 16. In certain embodiments, antenna 16 is designed to be robust and easy to manufacture in that it is designed not to be overly sensitive to production variation in the form of different substrate 24 thicknesses and resin mixes, and different track thicknesses (e.g., copper track thicknesses).

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A hybrid radio frequency identification (RFID) tag, comprising:
   circuitry comprising one or more passive RFID elements and one or more semi-active RFID elements operable to transmit and receive communications to and from one or more RFID tag tracking systems;
   a battery coupled to the one or more semi-active elements;
   a first antenna coupled to the passive RFID elements and to the semi-active RFID elements, the first antenna comprising a shape that defines a first open area and a second open area; and
   wherein the circuitry is positioned within one of the first and second open areas defined by the shape of the first antenna and the battery is positioned within the other of the first and second open areas defined by the shape of the first antenna.

2. The RFID tag of claim 1, wherein the shape of the first antenna comprises a substantially S-shape.

3. The RFID tag of claim 1, wherein the shape of the first antenna comprises a substantially W-shape or M-shape.

4. The RFID tag of claim 1, wherein a portion of the first antenna substantially separates on a common plane the first and second open areas defined by the shape of the first antenna.

5. The RFID tag of claim 1, wherein at least a portion of each of the circuitry, the battery, and the first antenna are formed on a common substrate.

6. The RFID tag of claim 1, wherein the first antenna comprises a printed circuit board (PCB) trace.

7. The RFID tag of claim 1, wherein the first antenna comprises an ultra-high frequency (UHF) dipole antenna.

8. The RFID tag of claim 1, wherein the first antenna comprises a single antenna shared between the one or more passive RFID elements and the one or more semi-active RFID elements of the circuitry.

9. The RFID tag of claim 1, wherein the first antenna is operable to communicate within each of the following frequency bands:
   315 MHz;
   433 MHz; and
   860 MHz to 928 MHz.

10. The RFID tag of claim 1, comprising an inductive element coupled to the first antenna and operable to perform a matching function for the RFID tag.

11. The RFID tag of claim 1, comprising a second antenna in one of the first and second open areas of the tag defined by the first antenna, the second antenna comprising an LF antenna.

12. The RFID tag of claim 11, wherein one or more of the following is true:
the second antenna substantially surrounds the circuitry; and
the second antenna substantially surrounds the battery.

13. The RFID tag of claim 11, wherein the second antenna comprises a coil antenna.

14. The RFID tag of claim 1, wherein the battery comprises a battery packaging that comprises a material that is operable to enhance a magnetic field of the first antenna.

15. The RFID tag of claim 1, wherein the battery comprises a battery packaging operable to serve as a counterpoint of a monopole.

16. A method for forming a radio frequency identification (RFID) tag, comprising:
providing circuitry comprising one or more passive RFID elements and one or more semi-active RFID elements operable to transmit and receive communications to and from one or more RFID tag tracking systems;
providing a battery coupled to the one or more semi-active elements;
providing a first antenna coupled to the passive RFID elements and to the semi-active RFID elements, the first antenna comprising a shape that defines a first open area and a second open area; and
wherein the circuitry is positioned within one of the first and second open areas defined by the shape of the first antenna and the battery is positioned within the other of the first and second open areas defined by the shape of the first antenna.

17. The method of claim 16, wherein the shape of the first antenna comprises one or more of the following:
a substantially S-shape; and
a substantially W-shape or M-shape.

18. The method of claim 16, wherein a portion of the first antenna substantially separates on a common plane the first and second open areas defined by the shape of the first antenna.

19. The method of claim 16, comprising providing at least a portion of each of the circuitry, the battery, and the first antenna on a common substrate.

20. The method of claim 16, wherein the first antenna comprises a printed circuit board (PCB) trace.

21. The method of claim 16, wherein the first antenna comprises an ultra-high frequency (UHF) dipole antenna.

22. The method of claim 16, wherein the first antenna comprises a single antenna shared between the one or more passive RFID elements and the one or more semi-active RFID elements of the circuitry.

23. The method of claim 16, wherein the first antenna is operable to communicate within each of the following frequency bands:
315 MHz;
433 MHz; and
860 MHz to 928 MHz.

24. The method of claim 16, comprising providing an inductive element coupled to the first antenna and operable to perform a matching function for the RFID tag.

25. The method of claim 16, comprising providing a second antenna in one of the first and second open areas of the tag defined by the first antenna, the second antenna comprising an LF antenna.

26. The method of claim 25, wherein one or more of the following is true:
the second antenna substantially surrounds the circuitry; and
the second antenna substantially surrounds the battery.

27. The method of claim 25, wherein the second antenna comprises a coil antenna.

28. The method of claim 16, wherein the battery comprises a battery packaging that comprises a material that is operable to enhance a magnetic field of the first antenna.

29. The method of claim 16, wherein the battery comprises a battery packaging operable to serve as a counterpoint of a monopole.

30. A hybrid radio frequency identification (RFID) tag, comprising:
circuitry comprising one or more passive RFID elements and one or more semi-active RFID elements operable to transmit and receive communications to and from one or more RFID tag tracking systems;
a battery coupled to the one or more semi-active elements;
a first antenna coupled to the passive RFID elements and to the semi-active RFID elements, the first antenna comprising one of the following shapes:
a substantially S-shape; or
a substantially W-shape or M-shape;
wherein:
the shape of the first antenna defines a first open area and a second open area; and
wherein the circuitry is positioned within one of the first and second open areas defined by the shape of the first antenna and the battery is positioned within the other of the first and second open areas defined by the shape of the first antenna, a portion of the first antenna substantially separating on a common plane the first and second open areas defined by the shape of the first antenna;
the RFID tag further comprises a second antenna in one of the first and second open areas defined by the first antenna, the second antenna comprising an LF antenna.

31. The RFID tag of claim 30, wherein at least a portion of each of the circuitry, the battery, and the first antenna are formed on a common substrate.

32. The RFID tag of claim 30, wherein the first antenna comprises an ultra-high frequency (UHF) dipole antenna.

33. The RFID tag of claim 30, wherein the first antenna comprises a single antenna shared between the one or more passive RFID elements and the one or more semi-active RFID elements of the circuitry.

34. The RFID tag of claim 30, wherein the first antenna is operable to communicate within each of the following frequency bands:
315 MHz;
433 MHz; and
860 MHz to 928 MHz.

35. The RFID tag of claim 30, wherein one or more of the following is true:
the second antenna substantially surrounds the circuitry; and
the second antenna substantially surrounds the battery.

36. The RFID tag of claim 30, wherein the second antenna comprises a coil antenna.

* * * * *

UNITED STATES PATENT AND TRADEMARK OFFICE
CERTIFICATE OF CORRECTION

PATENT NO. : 7,800,503 B2  
APPLICATION NO. : 11/747700  
DATED : September 21, 2010  
INVENTOR(S) : De Witte et al.

Page 1 of 1

It is certified that error appears in the above-identified patent and that said Letters Patent is hereby corrected as shown below:

Claim 19, Column 11, Line 46:

"comprising providing" should be "wherein"

"first antenna on a common substrate" should be "first antenna are formed on a common substrate"

Claim 24, Column 11, Line 63:

"comprising providing" should be "comprising"

Claim 25, Column 12, Line 1:

"comprising providing" should be "comprising"

Signed and Sealed this  
Twenty-ninth Day of May, 2012

David J. Kappos  
*Director of the United States Patent and Trademark Office*